MAGNETIC HEADS WITH MEANS FOR PREVENTING SIDE EROSION

Filed Sept. 20, 1961

INVENTOR
SIMON DUINKER
BY JULES BOS
Frank R. Jifani
AGENT

United States Patent Office 3,249,700

Patented May 3, 1966

3,249,700

MAGNETIC HEADS WITH MEANS FOR PREVENTING SIDE EROSION

Simon Duinker and Jules Bos, both of Emmasingel, Eindhoven, Netherlands, assignors to North American Philips Company, Inc., New York, N.Y., a corporation of Delaware

Filed Sept. 20, 1961, Ser. No. 139,468

Claims priority, application Netherlands, Sept. 27, 1960, 256,304

2 Claims. (Cl. 179—100.2)

Figure 1:
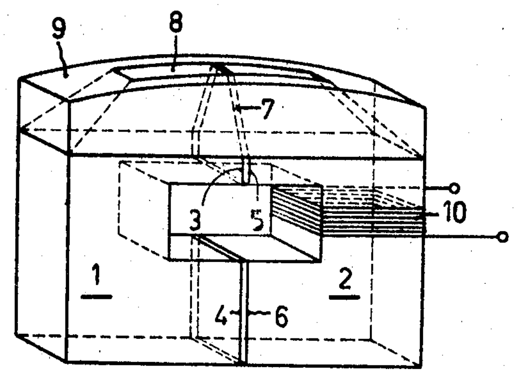

This invention relates to annular magnetic heads for writing, reproducing and/or erasing magnetic recordings in a narrow track of a magnetic record carrier; in particular, it relates to such heads which comprise at least two circuit parts of sintered oxidic ferromagnetic material which are separated by a useful gap filled with material which serves as a non-magnetic material to protect the gap and also to join the two circuit parts together.

The term "annular magnetic head" when used herein is to be understood to mean a magnetic head whose circuit parts, in the assembled state, enclose a central space in which one or more coils may be housed.

Narrow tracks of the order of 0.25 mm. or even less occur inter alia in magnetic record carriers used for recording video-information.

When using such a magnetic head, which usually has a very narrow guide surface because of the narrowness of the track on the record carrier, its length of life is found to be determined to a large extent by the amount of crumbling occurring at the sides of the head; it will be appreciated that the useful track width of the head gradually decreases due to the crumbling off of the sides. The "sides" referred to in this specification are those sides at or very near the guide surface of the head.

Efforts have been made to avoid crumbling off or erosion of the sides of the head by encapsulating the head in casting resin, but the resin wears away comparatively soon due to the forces exerted upon the head by the carrier; these forces may be considerable because of the high relative speed of the head with respect to the carrier (the speed may be 25 m./sec. or more). When the casting resin wears away, deterioration of the sides of the head cannot be prevented.

Efforts have also been made to protect the sides of the head by supporting them with the aid of nonmagnetic side plates composed, for example, of quartz. This step is found to be of little effectiveness since such side plates can not be secured to the ferromagnetic circuit without forming seams.

An object of the invention is to provide a head which will mitigate the above-mentioned disadvantages and will operate effectively for long periods without deterioration of its sides. According to one aspect of the invention, a magnetic head is provided in which each of the sides of that portion of the head which includes the useful gap is covered with a self-adhering layer of nonmagnetic material having a mechanical strength (including resistivity to wear) which is of the same order as that of the sintered oxidic ferromagnetic material; according to another aspect of the invention, those edges of the self-adhering layers which are adjacent the magnetic carrier during operation of the head are arranged co-planar with the guide surface at least in the direct vicinity of the gap.

Also according to the invention, a method for manufacturing such heads is disclosed in which at least the sides of that portion of the head which include the useful gap are covered with a second nonmagnetic material which self-adheres to the ferromagnetic material by the use of a thermal treatment and which, in the cooled state, has a mechanical strength and a resistivity to wear which is of the same order as that of the sintered oxidic ferromagnetic material; however, the temperatures used during the thermal treatment are lower than the temperature at which the nonmagnetic gap-filling material starts to deform.

In a second method according to the invention, first at least the sides of those portions of the head which are separated by the useful gap in the completed head are covered with a nonmagnetic material which is self-adhering to the ferromagnetic material by the use of a thermal treatment and which, in the cooled state, has a mechanical strength and a resistivity to wear about equal to that of the sintered oxidic ferromagnetic material; then, accurately processed gap-forming surfaces of the parts thus provided on their sides with nonmagnetic material are placed against each other with the interposition of a second nonmagnetic material which likewise is self-adhering to the ferromagnetic material by the use of a thermal treatment, these parts being pressed against each other at a pressure such that, in the cooled state, the length of the gap between the two parts corresponds to the desired length of the useful gap, this second nonmagnetic material in the cooled state likewise having a mechanical strength and a resistivity to wear which is substantially equal to that of the sintered oxidic ferromagnetic material; the temperatures occurring during the last-mentioned thermal treatment are lower than the temperature at which the nonmagnetic material covering the sides of the head starts to deform.

It is to be noted that the nonmagnetic materials employed preferably have coefficients of expansion substantially equal to the corresponding coefficient of expansion of the sintered oxidic ferromagnetic material for the whole temperature range of the thermal treatments.

Figure 2:
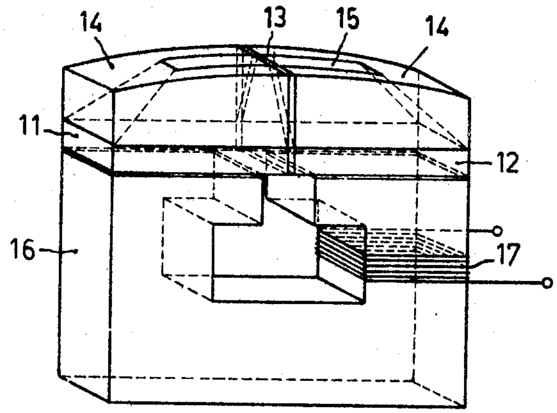

In order that the invention may be readily carried into effect, two embodiments will now be described in detail, by way of example, with reference to the accompanying diagrammatic drawing, in which:

FIGURE 1 shows one embodiment of a head constructed according to the invention; and FIGURE 2 shows a second embodiment of a head constructed according to the invention.

In FIGURE 1, the magnetic head shown comprises two circuit parts 1 and 2, both of which are composed of sintered oxide ferromagnetic material. Each circuit part has two accurately processed surfaces 3, 4 and 5, 6 respectively. A gap 7 formed by the surfaces 3 and 5 and along which the magnetic record carrier is guided, is filled with a nonmagnetic material which serves to protect the gap and also to join the two circuit parts together.

Examples of such nonmagnetic materials are glass, solder and water-glass.

By preferably providing that the contact surface area of the surfaces 4 and 6 is large relative to the contact surface area of the surfaces 3 and 5, it is ensured that the magnetic reluctance produced by the gap between the surfaces 4 and 6 is low relative to the magnetic reluctance produced by the gap between the surfaces 3 and 5. The surfaces 4 and 6 may be joined in any desired manner, the particular manner forming no part of this invention. For these surfaces it is also possible to achieve the adhesion by using glass, solder or water-glass.

In the manufacture of such a head, a sheet of solder or glass may be provided between the surfaces 3 and 5 and also between the surfaces 4 and 6. The assembly is then heated to a temperature at which the solder or the glass melts or softens. Subsequently, the circuit parts with the interposed solder or glass in the molten or softened state are pressed against each other at a pressure such that the gap between the surfaces 3 and 5 has the ultimately desired length. After cooling of the assembly, a guide surface 8 at the upper portion of the head is obtained by accurate processing, generally involving polishing. The method is disclosed in U.S. Patent 3,024,318.

Another method for the manufacture of such a head is the following: Each of the accurately-processed surfaces 3, 4, 5 and 6 is covered, for example, with a thin liquid layer of water-glass. The circuit parts thus covered with thin liquid layers of water-glass are then heated to a suitable temperature (800° to 900° C. with a solution of water-glass containing from 7% to 9% by weight of $Na_2O$ and from 24% to 27% by weight of $SiO_2$) so that the water-glass layers vitrify. The surfaces of the circuit parts 1 and 2 thus covered with vitrified water-glass layers are placed against each other. After heating to a suitable temperature (likewise 880° to 900° C. in example chosen) the water-glass, upon cooling, hardens into a layer which adheres to the ferromagnetic material and which has a mechanical strength substantially equal to that of the ferromagnetic material.

The portion including the useful gap of the assembly thus obtained is then immersed in a liquefied second nonmagnetic material which, similarly to the gap-filling material, has the property of self-adhering to the ferromagnetic material upon passing from the liquid state to the solid state; the second nonmagnetic material in the solid state also has a mechanical strength and more particularly a resistivity to wear substantially equal to that of the ferromagnetic material. However, the temperatures occurring during the thermal treatment for the second nonmagnetic material must naturally not be so high that the gap-filling material melts or softens again. Thus, if for example glass or solder is used as the second nonmagnetic material, the temperature at which this glass or solder is in the liquid state must not be so high that, when the portion of the head including the useful gap contacts the softened glass or the molten solder, the gap-filling material also starts softening or melting. If water-glass is used as the second nonmagnetic material, the temperature required for vitrifying this water-glass must likewise not be so high that the gap-filling material deforms. A single example may be mentioned to illustrate this: A glass is used as the gap-filling material which has, for example, the following composition:

| | Percent by weight |
|---|---|
| $SiO_2$ | 76.6 |
| $CaO$ | 4.6 |
| $MgO$ | 3.1 |
| $Al_2O_3$ | 1.0 |
| $Na_2O$ | 14.3 |
| $K_2O$ | 0.3 |
| $Fe_2O_3$ | 0.075 |
| $TiO_2$ | 0.03 |
| $MnO$ | 0.004 |
| $CuO$ | 0.0003 |

This glass starts to soften between 650° and 700° C. The second nonmagnetic material used for covering the the sides of the head in the vicinity of the gap is, for example, a glass (enamel) of the following composition:

| | Percent by weight |
|---|---|
| $B_2O_3$ | 15.3 |
| $PbO$ | 64.0 |
| $ZnO$ | 10.8 |
| $CoO$ | 0.9 |
| $SiO_2$ | 9.0 |

This glass starts to soften at about 550° C.

When the second nonmagnetic material has cooled down and adhered to the ferromagnetic material, the excess material present above the guide surface 8 is removed by grinding and polishing so that the guide surface of the head is again free of the second nonmagnetic material and the edges of this material on the sides of the head, at least in the vicinity of the gap, are co-planar with the guide surface of the head. A resulting layer 9, formed by the second nonmagnetic material on the sides of the head in the vicinity of the useful gap, is found to afford effective protection against crumbling off or erosion of the sides by the action of the forces exerted upon the head by the magnetic record carrier.

In FIGURE 1, the coil to which the signals to be recorded are supplied during the recording process and from which the recorded signals are derived during the reading process surrounds the core part 2 and is indicated by 10.

FIGURE 2 shows a second example of a magnetic head according to the invention. Circuit parts 11 and 12, separated by a useful gap 13 in the completed head, constitute in this example only the pole-piece of the head. According to this embodiment the sides of these circuit parts are covered with a nonmagnetic material 14 using a thermal treatment, which material self-adheres to the ferromagnetic material of the circuit parts on cooling and again has, in the cooled state, a mechanical strength and a resistivity to wear of the same order as that of the sintered oxidic ferromagnetic material. It will be appreciated that during this step part of the nonmagnetic material will flow onto the gap-forming surfaces. After cooling, the nonmagnetic material which has found its way onto the gap-forming surfaces, is removed in a manner such that the edges of the layers of nonmagnetic material which are adjacent to the gap are co-planar with the gap-forming surfaces.

The gap-forming surfaces of the circuit parts 11 and 12 thus provided with protective layers are then placed against each other with the interposition of a second nonmagnetic material which likewise self-adheres on cooling to the ferromagnetic material; the circuit parts are pressed against each other, while heat is applied at a pressure such that, in the cooled state, the length of the gap between the parts 11 and 12 is equal to the desired length of the useful gap. In the cooled state, this second nonmagnetic material likewise has a mechanical strength and resistivity to wear about equal to that of the sintered oxidic ferromagnetic material.

In the embodiment of FIG. 2, it is necessary to ensure that the temperatures occurring during the second thermal treatment are lower than the temperature at which the nonmagnetic material 14 starts to deform. Thus, the material used as a gap-filling material in the head of FIGURE 1 may serve as the material 14 of FIG. 2 and the material 9 used in the head of FIGURE 1 for covering the sides of the head in the vicinity of the useful gap may serve as the gap-filling material in the head of FIG. 2.

In the next step in manufacturing the head of FIG. 2, the excess material 14 and also the excess gap-filling material present above a guide surface 15 are removed by grinding and polishing in a manner such that guide surface of the head is free to co-act with the magnetic carrier, and that those edges of the nonmagnetic materials which are adjacent the magnetic carrier during operation of the head are co-planar with the guide surface 15 at least in the vicinity of the gap.

The head of FIG. 2 is completed by a closure piece 16 on which a coil 17 is arranged. The pole-piece may be connected to the closure yoke 16 by any suitable means, for example with the aid of an adhesive or by mechanical means such as the clasp. The material of the closure piece 16 is preferably also sintered oxidic ferromagnetic material.

While the invention has been described with respect to specific embodiments, it will be appreciated that many variations and modifications thereof will be readily apparent to those skilled in the art without departing from the inventive concept, the scope of which is set forth in the appended claims.

What is claimed is:

1. An annular magnetic head for recording, reproducing and/or erasing magnetic recordings in a narrow track of a magnetic record carrier, comprising at least two circuit parts composed of sintered oxidic ferromagnetic material, said parts being separated by a useful gap filled with a first nonmagnetic material which protects the gap and bonds the two circuit parts together, a portion of said circuit parts and said gap forming a guide surface having a plurality of sides, said sides of said guide surface and another portion of said circuit parts being covered with a layer of a second nonmagnetic material which is bonded to said ferromagnetic material at all of said sides and said another portion and which extends outwardly from each of said sides, said layer having a mechanical strength and resistivity to wear substantially equal to that of the sintered oxidic ferromagnetic material, the part of said layer which is adjacent to the record carrier during operation of the head being substantially co-planar with the guide surface of the head.

2. An annular magnetic head for recording reproducing and/or erasing magnetic recordings in a narrow track of a magnetic record carrier, comprising at least two circuit parts composed of sintered oxidic ferromagnetic material, said parts being separated by a useful gap filled with a first nonmagnetic material which protects the gap and bonds the two circuit parts together, a portion of said circuit parts and said gap forming a guide surface having a plurality of sides, said sides of said guide surface and another portion of said circuit parts being covered with a layer of a second nonmagnetic material which is bonded to said ferromagnetic material at all of said sides and said another portion and which extends outwardly from each of said sides, said layer having a mechanical strength and resistivity to wear substantially equal to that of the sintered oxidic ferromagnetic material, the part of said layer which is adjacent to the record carrier during operation of the head being substantially co-planar with the guide surface of the head, both of said nonmagnetic materials having coefficients of expansion substantially equal to the coefficient of expansion of the sintered oxidic ferromagnetic material at the temperature at which the ferromagnetic material is used.

References Cited by the Examiner

UNITED STATES PATENTS

| | | | |
|---|---|---|---|
| 2,628,286 | 2/1953 | Rettinger | 179—100.2 |
| 2,674,031 | 4/1954 | Buhrendorf | 29—155 |
| 2,676,392 | 4/1954 | Buhrendorf | 29—155 |
| 2,861,135 | 11/1958 | Rettinger | 179—100.2 |
| 2,908,770 | 10/1959 | Warren | 179—100.2 |
| 2,923,779 | 2/1960 | Namenyi-Katz | 179—100.2 |
| 2,945,919 | 6/1960 | Neumann | 179—100.2 |
| 3,092,692 | 6/1963 | Javorik | 179—100.2 |

OTHER REFERENCES

Dec. 2, 1957, "Magnetic Head With Replaceable Pole Caps," (Rettinger), RCA Technical Note No. 86.

BERNARD KONICK, *Primary Examiner.*

IRVING L. SRAGOW, *Examiner.*

M. KIRK, *Assistant Examiner.*